United States Patent [19]

Curry et al.

[11] Patent Number: 4,664,307

[45] Date of Patent: May 12, 1987

[54] SPIRALLY WELDED TANK CARS

[75] Inventors: Jay M. Curry, Brookfield, Ohio;
Edward R. Gray, Wheatland, Pa.;
Edward L. Davis, Youngstown, Ohio;
Edward J. Rollo, Jr., Sharpsville;
Paul D. Long, Jr., Grove City, both
of Pa.

[73] Assignee: General American Transportation Corporation, Chicago, Ill.

[21] Appl. No.: 778,178

[22] Filed: Sep. 20, 1985

Related U.S. Application Data

[63] Continuation of Ser. No. 517,032, Jul. 25, 1983, abandoned.

[51] Int. Cl.$^4$ .................... B23K 31/02; B61D 5/00
[52] U.S. Cl. ........................... 228/145; 228/161;
228/184; 105/358; 105/360; 280/5 R
[58] Field of Search .............. 105/358, 360, 451;
228/145, 184, 17.7, 161; 280/5

[56] References Cited

U.S. PATENT DOCUMENTS

| | | | |
|---|---|---|---|
| 378,769 | 2/1888 | Coas | 228/173 |
| 3,217,402 | 11/1965 | Eckhardt | 29/477.3 |
| 3,230,122 | 1/1966 | Swaffer et al. | 156/187 |
| 3,314,141 | 4/1967 | Bacroix | 29/477.3 |
| 3,374,528 | 3/1968 | Bowcutt et al. | 29/471.1 |
| 3,379,478 | 4/1968 | Aller et al. | 105/358 X |
| 3,380,147 | 4/1968 | McDonald | 29/429 |
| 3,432,914 | 3/1969 | Huck | 29/477.3 |
| 3,479,724 | 11/1969 | Kruizenga et al. | 105/358 X |
| 3,595,307 | 7/1971 | Larssen et al. | 105/451 X |
| 3,662,692 | 5/1972 | Price | 105/358 |
| 3,685,458 | 8/1972 | Price | 105/358 |
| 4,061,264 | 12/1977 | Bartels et al. | 228/145 |
| 4,074,847 | 2/1978 | McFatter | 228/145 |

FOREIGN PATENT DOCUMENTS 308419  3/1929  United Kingdom.

OTHER PUBLICATIONS

PRD—Transmission Pipe Mills.

Primary Examiner—Robert B. Reeves
Assistant Examiner—Glenn B. Foster
Attorney, Agent, or Firm—Hill, Van Santen, Steadman & Simpson

[57] ABSTRACT

Railroad tank cars are provided with spirally wound cylindrical tanks spanning and supported on wheeled trucks with a continuous weld extending the full length of the tank. A steel plate ribbon or strip is spirally wound in the form of a right circular cylinder with a continuous weld bonding the edges of the strip in abutted relation to provide the tank side wall. The open ends of the resulting cylinder tube are closed by welded-on end caps and suitable openings are provided in the tube for manways, vents, valves and the like. A heating coil may be provided on the inside or outside of the tank in intimate contact with the spirally wound ribbon and conventional insulation and jacketing may be provided around the tank. Drop center and center sump tank are provided by cutting the spirally wound tube along a diagonal plane, rotating adjoining sections 180°, placing the diagonal cut ends in abutting relation to incline the sections relative to each other and butt welding the abutted ends with a continuation of the spiral weld.

3 Claims, 17 Drawing Figures

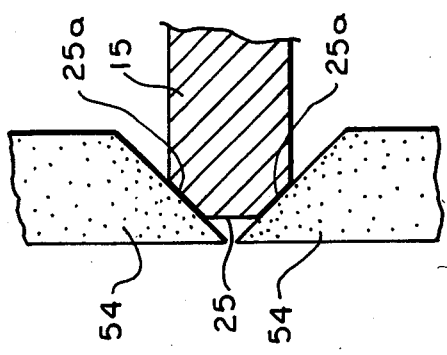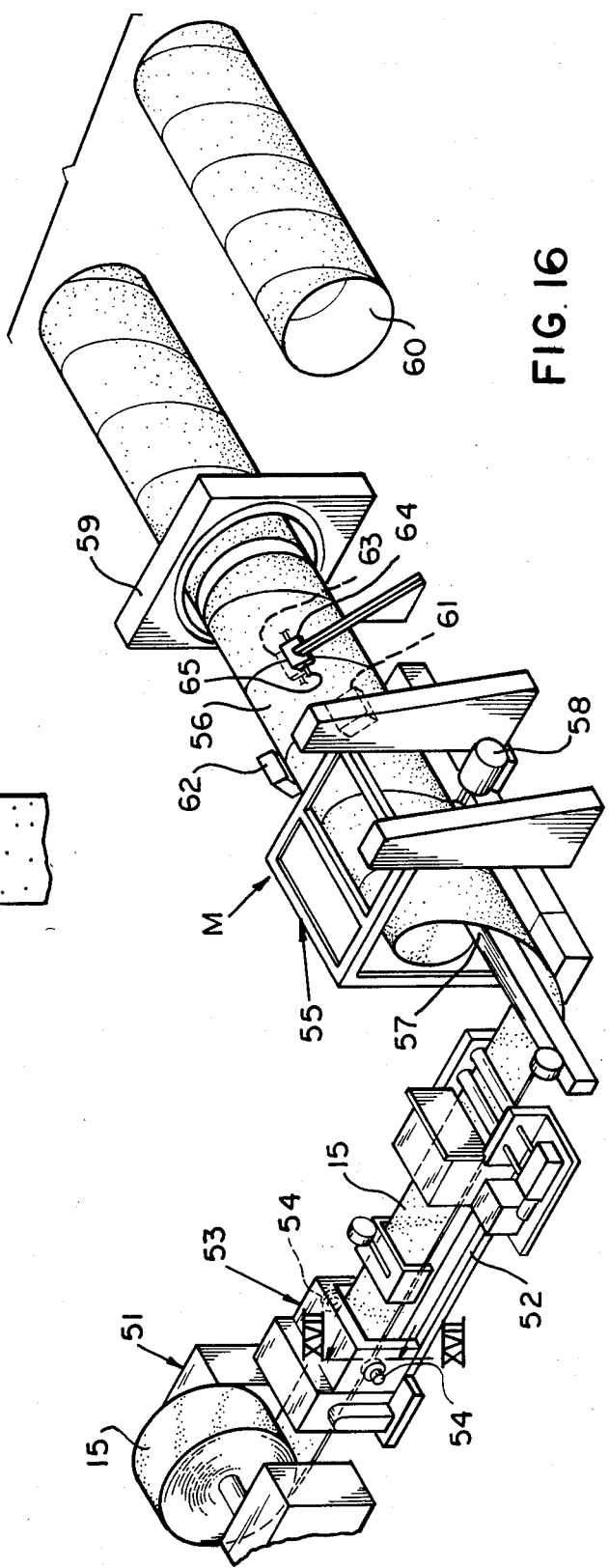
FIG. 17
FIG. 16

SPIRALLY WELDED TANK CARS

This is a continuation of application Ser. No. 517,032, filed July 25, 1983, now abandoned.

BACKGROUND OF THE INVENTION

1. Field of the Invention

This invention relates to the art of tank vehicles, particularly railroad tank cars and specifically deals with tank cars formed from a spirally wound steel plate strip with adjoining edges of the strip united by a continuous spiral weld.

2. Prior Art:

Conventional tank car constructions include the bending of steel plates into cylinder form, the joining of the adjacent ends of the plates with a longitudinal weld, and the welding together of the resulting tubes or hoops in end-to-end abutted relation with circumferential weld bonds. These constructions have flat or out-of-round areas along the longitudinal welds, mis-matches in adjoining tubular sections producing sumps and humps and always result in a plurality of weak T-shaped weld sections where the longitudinal weld seams join the circumferential weld seams. This conventional end-to-end cylinder tank construction is expensive, its assembly requires considerable shop floor space because of the number of work stations that are required, results in out-of-round dimensional variations, involves considerable scrap loss and requires weakened weld sections.

It would therefore be an improvement in this art to construct portable tanks for tank cars, and the like by spirally coiling a steel plate strip or ribbon into tube form with a continuous weld seam uniting abutting edges of the strip.

SUMMARY OF THE INVENTION

According to this invention a strip or ribbon of high strength low alloy steel plate such as ASTM-A-515 and A-516, stainless steel, aluminum alloys such as ASTM 5520, and the like metals of the type used for pressure vessels is used to form tanks for tank cars. The preferred metal plate strip has a yield strength of 50–90,000 lbs., a thickness of $\frac{1}{8}$ to 1 inch, a width of 24 to 72 inches, and a length sufficient to provide a tank tube of the desired gallonage capacity. The plate strip is spirally coiled in a mill forming a right circular cylinder of 4 to 12 in diameter with the edges of the strip abutted together and welded as the strip is coiled. The strip edges are preferably beveled or tapered, preferably from both faces of the strip so that when they are abutted together, troughs are formed on both the inside and outside diameters of the tube. Inside and outside weld seams fill these troughs flush with the tube surfaces or with slight crowns of less than 1/16 inch. The weld beads are continuous with a helix angle determined by the width of the strip and the diameter of the tube. The I.D. and O.D. bevels reduce the thickness of the strip about 10 to 90 percent of its full thickness providing ample depth for the weld seams. In some instances butt welding without beveling the edges is useful.

The welded spiral wound tube is cut into desired lengths to satisfy the specified storage capacity for the tank. The cutting for a straight tubular tank formed from a one-piece strip is normal to the tank axis. The cutting for drop center tanks formed from two tube sections is inclined relative to the axis of the tube in an amount desired for the degree of inclination of the tube sections. Angles of from $\frac{1}{2}$ to 5 degrees are useful. One of the tube sections is then rotated circumferentially 180° and the angled ends of both sections are abutted together and circumferentially welded. The outboard ends of the tube sections are trimmed to provide vertical end faces.

A sump tank can be formed from three tube sections having angled ends with the center section rotated circumferentially 180° relative to the end sections so that when the angled ends are abutted and welded together the center section will have a horizontal axis while the axes of the end sections will slope upwardly at an angle from the horizontal determined by the angle cut. Angles of $\frac{1}{2}$ to 5 degrees are useful.

The helical welds of each section merge into the circumferential welds uniting the sections so that a continuous weld seam extends along the entire length of the resulting tank.

The open ends of the tube formed from a one-piece strip for the horizontal axis tank, the two piece strip for the drop center tank, or the three piece strip for the center sump tank are closed by domed end caps welded circumferentially to the ends.

Conventional railroad car wheeled trucks support the tanks adjacent their outboard ends and the tanks span the space between the trucks providing sufficient strength and rigidity to withstand all stresses encountered in the use of the tank cars.

It is then an object of this invention to provide railroad tank cars having spirally coiled tank tubes with coils united by a continuous weld seam.

Another object of this invention is to provide tank cars of the type having longitudinally spaced wheeled trucks and a horizontally elongated tank spanning and supported on said trucks with the tank formed from a tube of spirally wound steel ribbon having abutting edges with a continuous weld uniting the abutted edges and extending the full length of the tube and with end caps closing the ends of the tube.

A further object of this invention is to provide tank cars with spirally coiled tubular tanks having continuous inside and outside weld seams flush with the surfaces of the tube or slightly crowned therefrom to be easily ground flush for heat exchange contact with inside and outside heating coils.

A still further object of this invention is to provide a drop center tank car formed from two sections of spirally wound tubes.

A further specific object of the invention is to provide a sump center tank car formed from three sections of spirally wound tubes in end-to-end relation.

Another object of the invention is to decrease the cost and minimize the required assembly space for manufacturing railroad tank cars.

A still further object of the invention is to provide a method of making railroad tank cars from a continuous strip of steel plate.

A further specific object of the invention is to provide a method of making spirally wound tanks with continuous helical weld seams around the inner and outer surfaces thereof.

Other and further objects of this invention will become apparent to those skilled in this art from the following detailed description of the annexed sheets of drawings which, show best mode embodiments of the invention.

ON THE DRAWINGS

FIG. 16 is a perspective view of a mill for producing tank tubes according to this invention.

FIG. 17 is a fragmentary cross sectional view generally along the line XVII—XVII of FIG. 16 illustrating the chamfering or beveling of an edge of the strip forming the tube.

AS SHOWN ON THE DRAWINGS

Figure 1:
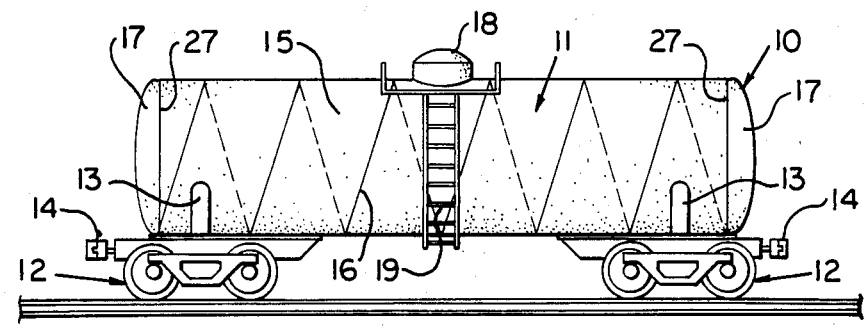
FIG. 1 is a side elevational view of a horizontal axis spirally welded tank car of this invention.

The tank car 10 of FIG. 1 has a horizontal axis right circular cylindrical tank 11 spanning and mounted on conventional wheeled trucks 12,12. These trucks have saddles 13 underlying and embracing the tank 11 near the ends thereof and, as is conventional in the art, the wheel carrying frame of each truck is pivoted on a vertical axis relative to the saddles. The conventional coupling draw bars 14 project from the truck frames.

The tank 11 has a side wall composed of a cylindrical tube formed from a spirally coiled or wound single steel plate strip 15 with abutted edges joined by a continuous helical weld seam 16. The tube has vertical ends closed by domed end caps 17. The top central portion of the tube has a manhole cut therethrough and a conventional domed inlet 18 is welded therearound. An access ladder 19 to the inlet 18 embraces the side of the tank 11.

Figure 4:
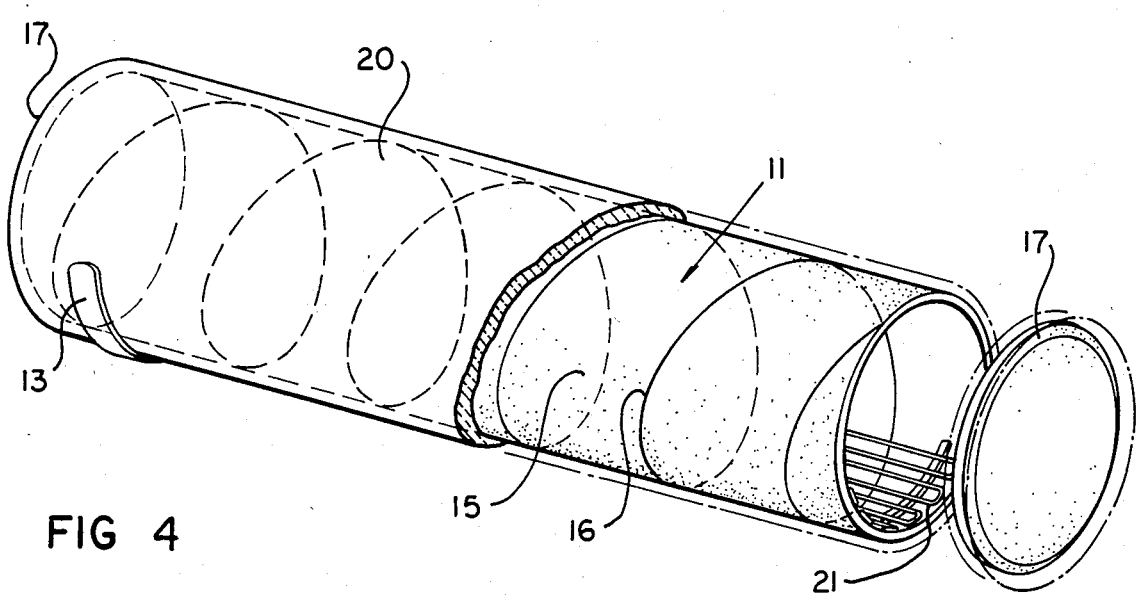
FIG. 4 is a perspective view with parts broken away and opened illustrating a tank provided with an internal heating coil according to this invention.

The tank 11, as better shown in FIG. 4, may be covered with a jacket of insulation 20 and has an internal heating coil 21. The weld seam 16 is continuous extending from one end cap 17 to the opposite end cap 17 in a true helical path. This seam is flush or only slightly crowned with both the inside and outside surfaces of the tank and, as hereinafter described, has inside and outside weld bonds filling grooves provided by chamfered or tapered edges of the strip or plate 15. Any objectionable crowns are easily ground to acceptable levels. The inside and outside surfaces of the tank are truly cylindrical and free from humps or depressions along their entire length and around their entire circumference. As a result, the insulation 20 and the heating coil assembly 21 have intimate contact with the surfaces.

Figure 5:
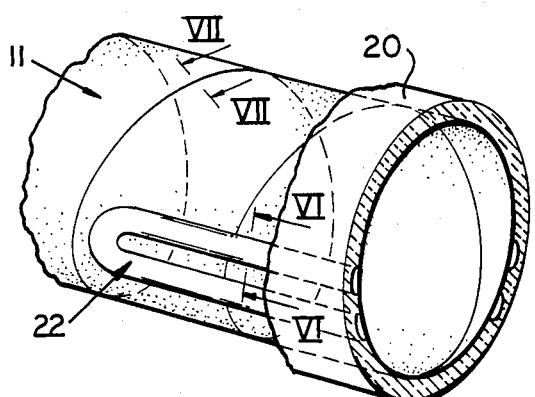
FIG. 5 is a view similar to FIG. 4 but showing an external heating coil for the tank.
Figure 6:
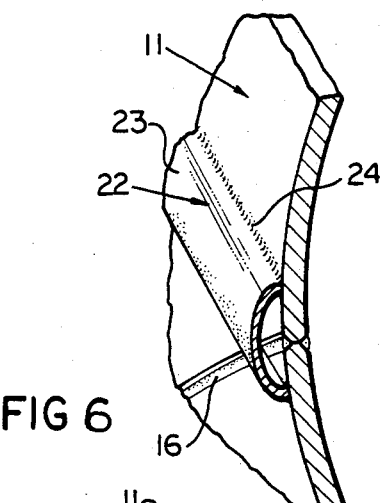
FIG. 6 is a fragmentary transverse sectional view along the line VI—VI of FIG. 5.

As shown in FIGS. 5 and 6 the tank 11 may also be provided with a heating coil 22 on the outside surface thereof with the coil in turn being covered by the insulation 20. This coil 22 can be formed of a channel shaped member or a plurality of members 23 with open faces closed by the outer peripheral wall of the tank and with the side legs welded to this wall as illustrated at 24 in FIG. 6. Since the tank surface is relatively free from undulations, substantial projecting weld beads or the like discontinuities, the coil is easily applied and the heating fluid has intimate contact with the tank wall.

Figure 7:
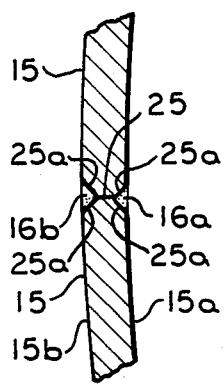
FIG. 7 is a fragmentary cross sectional view along the line VII—VII of FIG. 5.

As illustrated in FIG. 7, the plate strip 15 forming the tube or side wall of the tank 11 has chamfered or tapered sides providing reduced thickness edges 25 which are abutted together and diverging inclined or tapered edges 25a at the ends of the edges 25 providing grooves which are filled by an inside weld seam 16a and an outside weld seam 16b. As illustrated, the strip 15 has an inside surface 15a and an outside surface 15b, the continuity of which is preserved by the weld seams 16a and 16b to provide uninterrupted smooth continuous surfaces.

The ends of the spirally wound cylindrical tube or side wall of the tank are vertical and receive the peripheries of the domed closure caps thereagainst. Circumferential weld seams 27 unite the end caps 17 to these vertical ends around the entire circumference of the tube.

Figure 2:
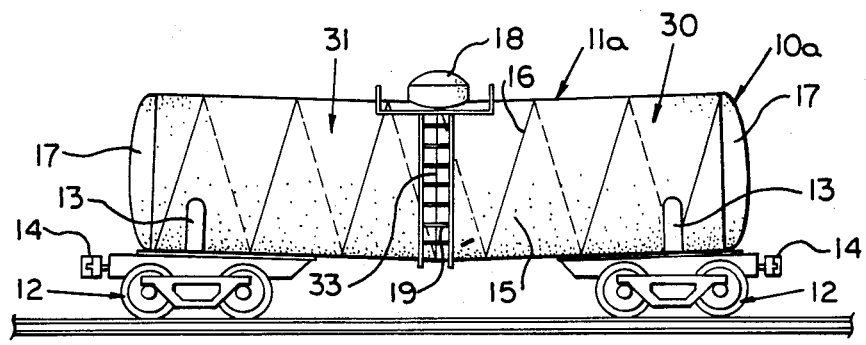
FIG. 2 is a side elevational view of a drop center spirally welded tank car of this invention.
Figure 8:
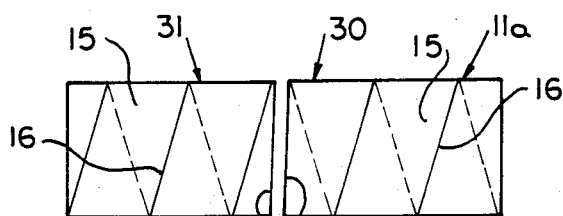
FIG. 8 is a somewhat diagrammatic side elevational view illustrating a pair of spirally wound tube sections with inclined adjoining ends for forming a drop center tank of this invention.

The drop center tank car 10a illustrated in FIG. 2 is formed from the same components as the tank car 10 of FIG. 1 and corresponding parts have been marked with the same reference numerals. However, a modified tank 11a is provided, being formed from two spirally wound right circular cylindrical tube sections 30 and 31. As illustrated in FIG. 8 each tube section 30 and 31 is formed from a single spirally wound steel plate strip or ribbon 15, the edges of which are abutted together and joined by the above described helical weld seams 16. The tubes 30 and 31 are preferably cut from a single tube length in a transverse plane inclined from the longitudinal axis of the tube at an angle desired for the pitch of the drop center tank. This cut provides adjacent parallel oval ends 32. The sections 30 and 31 have a length to provide one-half of the specified capacity for the tank.

Figure 9:
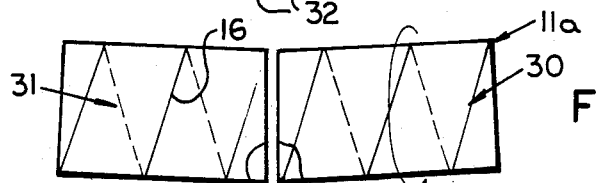
FIG. 9 is a view similar to FIG. 8 but illustrating one of the tube sections rotated circumferentially 180° so that when the adjoining ends are abutted together the tube sections will incline upwardly therefrom.

As shown in FIG. 9, the section 30 is circumferentially rotated 180° from the end-to-end aligned position of FIG. 8 so that when the joining ends 32 are abutted together the axes of the sections 30 and 31 will incline upwardly from the abutted ends. A circumferential weld seam 33 unites the abutted together ends 32 as shown in FIG. 2. The outboard ends of the welded together sections 30 and 31 can be trimmed to present vertical end faces for receiving the end caps 17.

Figure 3:
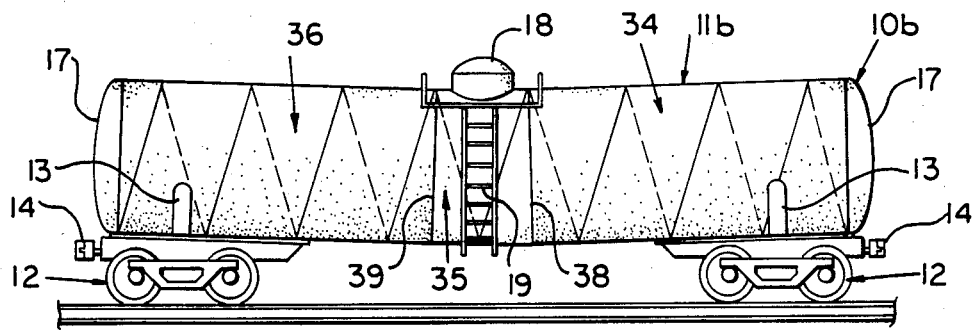
FIG. 3 is a side elevational view of a center sump spirally welded tank car of this invention.
Figure 10:
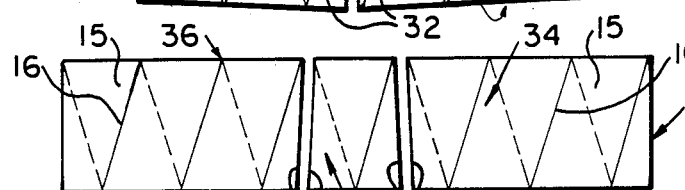
FIG. 10 is a view similar to FIG. 8 but illustrating three spirally wound tube sections with adjoining ends cut at an angle to the axis thereof for forming a center sump tank of this invention.

The center sump tank car 10b of FIG. 3 has the same conventional truck, saddle, draw bar, end caps, dome and ladder components as the above described tank cars 10 and 10a. However a modified tank construction 11b is provided. This construction, as shown in FIG. 10 is formed from three spirally wound tube sections 34, 35 and 36 cut from a single cylindrical tube composed of a welded spirally wound steel strip of ribbon 15 welded together at its edges by a spirally weld seam 16 as described above. Oppositely inclined cuts are made at an angle to the longitudinal axis of the tube providing adjoining pairs of oval shaped ends 37. The cuts are positioned to provide elongated end sections 34 and 36 of the same length and a short central section 35. The lengths are adjusted to provide the specified capacity for the resulting tank.

Figure 11:
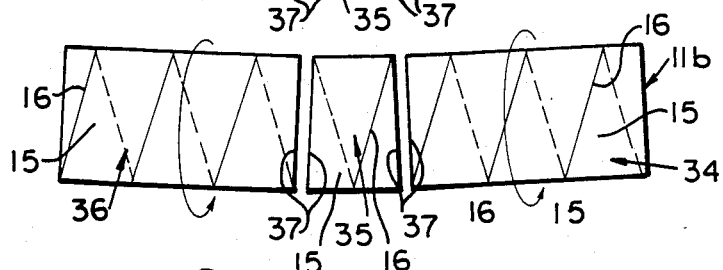
FIG. 11 is view similar to FIG. 10 but illustrating the center tube section rotated circumferentially 180° so that when the end sections are abutted therewith they will incline upwardly therefrom.

As shown in FIG. 10, the central section 35 because of the oppositely inclined ends 37 is longer at its bottom than at its top so that when, as shown in FIG. 11, the end sections 34 and 36 are rotated circumferentially 180° relative to the central section 35 the end sections are inclined relative to the central section when the adjoining pairs of ends 37 are abutted together. Alternately the same result can be obtained by rotating the central section 35, 180° relative to the end sections 34 and 36. Circumferential weld seams 38 and 39 shown in FIG. 3, unite the adjoining pairs of ends 37. The resulting configuration thus has a central horizontal axis cylindrical section 35 at a low level with upwardly inclined end sections 34 and 36 extending therefrom.

The tank car 10b thus has a lowered central sump which can be drained through suitable valves etc. (not shown).

From the above descriptions it will be understood that the tank cars 10, 10a and 10b each have spirally welded tanks with tubular side walls provided in one, two or three sections with a continuous weld extending the full length of the tank.

Figure 12:
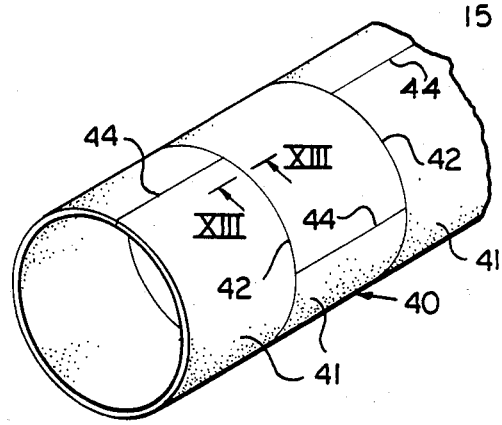
FIG. 12 is a somewhat diagrammatic perspective view illustrating the convention tank construction for tank cars.
Figure 13:
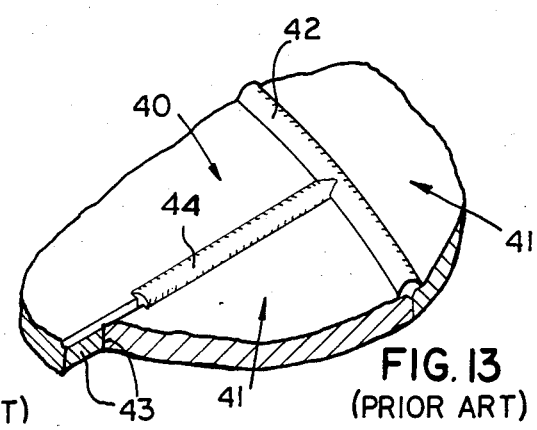
FIG. 13 is a transverse sectional view along the line XIII—XIII of FIG. 12 illustrating a T-weld required in the construction.

By contrast, conventional tank cars have tanks built up from a plurality of plates first formed into cylindrical short length tubes and then welded together in end-to-end relation as shown in FIGS. 12 and 13. As here shown the prior art tank tube 40 is formed from a plurality of short length cylindrical hoops 41 in abutted together end-to-end relation joined by circumferential weld seams 42. Each hoop 41 is rolled from a flat plate which must be trimmed to size to be formed into a generally cylindrical shape with the opposite ends of the plate abutted together as shown at 43 and welded by a longitudinal seam 44. The formation of the hoops from flat plates results in out of round cylinders with flat zones adjacent the longitudinal weld seam 44. These out of round hoops do not fully mate together in end-to-end relation and the cicumferential weld seams 42 in attempting to secure together the out of round sections to form a cylindrical tube result in wavy portions with hills and valleys along the length of the tube. Further, weld seams form beads projecting from the tube both around its periphery and along its length interfering with intimate contact between the tank wall and heating coils or the like.

In addition T weld sections are formed wherever the longitudinal seams 44 mate with the circumferential seams 42 as shown in FIG. 13. These sections are weak and to prevent the formation of fully crossed seams the hoops are rotated to offset the longitudinal seams as illustrated in FIG. 12. This further distorts the tube configuration.

Figure 14:
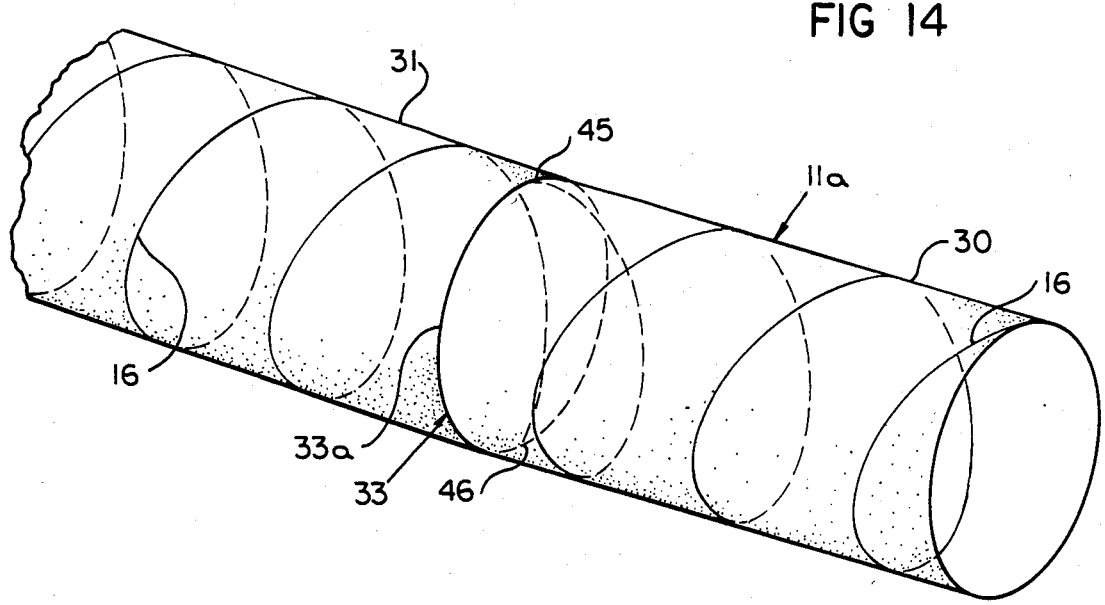
FIG. 14 is a perspective view illustrating the continuous weld seam for the drop center tank of this invention.

FIGS. 1 and 4 illustrate the continuous helical weld seam 16 extending the full length of the tank 11. It should be understood, however, that a continuous weld seam is also provided in the tanks 11a and 11b even though they are composed of more than one spirally wound tube section. Thus as shown in FIG. 14, the tank 11a composed of the tube sections 30 and 31 has a continuous weld seam 16 which is helical in each section. The helices are joined by a semicylindrical portion 33a of the cylindrical weld seam 33 uniting the sections 30 and 31 in end-to-end relation. The end of the helix weld seam 16 of the section 30 merges at 45 into the circumferential weld seam 33 and then continues circumferentially around the portion 33a of this seam to merge at 46 with the end of the helix weld seam 16 of the section 31. Thus the helices 16 of the sections 30 and 31 are joined in end-to-end relation through a circumferential seam 33a to provide a continuous weld seam extending along the full length of the tank.

Figure 15:
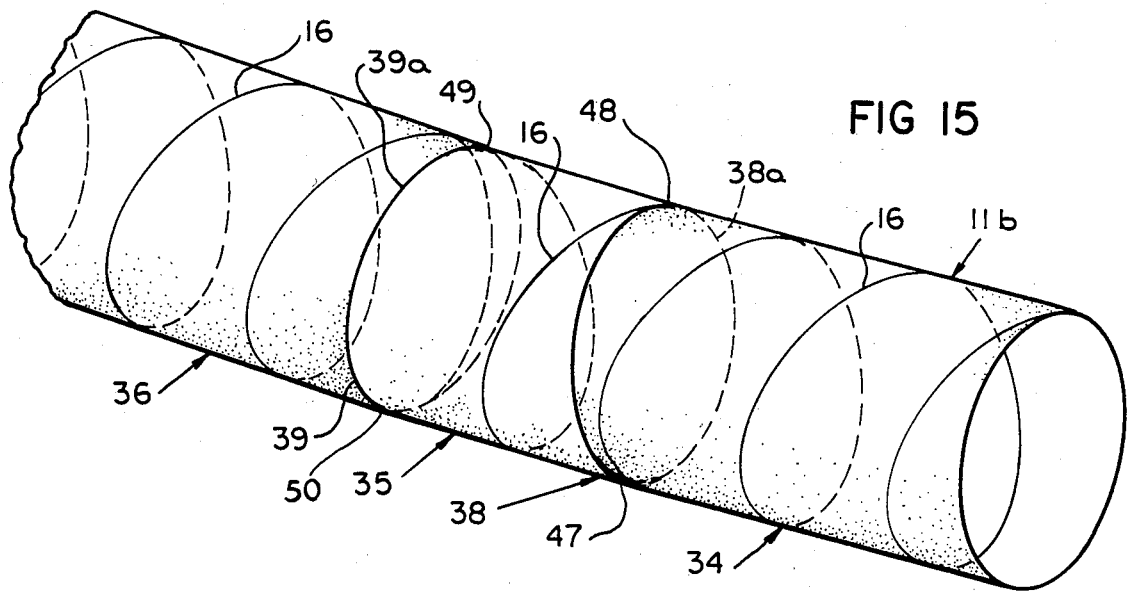
FIG. 15 is a view similar to FIG. 14 but illustrating the continuous weld seam for the sump tank of this invention.

As illustrated in FIG. 15, the sump tank 11b also has a continuous weld seam 16 extending from one end of the tank to the opposite end. As there shown the helix seam 16 of the tube section 34 merges at 47 into the circumferential weld seam 38 and then continuous around a portion 38a of this circumferential seam to merge at 48 with the helix seam 16 of the center section 35. This helix seam 16 in turn merges at 49 into the circumferential seam 39 and is connected through the portion 39a of this seam with the end of the helix seam 16 of the section 36 to merge therewith at 5°. Here again a single continuous weld seam extends from one end to the other end of the tank 11b with the helices 16 of the sections 34, 35 and 36 being joined in end-to-end relation by portions of the circumferential seams 38 and 39 as illustrated at 38a and 39a.

As shown in FIG. 16, a mill M is used to form the spirally wound tubes of the tanks of this invention. This mill M rotatably supports, at 51, a wound coil of the steel plate strip or ribbon 15. The ribbon or strip is unwound and flattened over a table 52 by conventional flattening rollers and the like. A station 53 on the table 52 is provided with edge cutters 54 better shown in FIG. 17 to form the tapers or chamfers 25a on the flat end edges 25 of the strip 15. The flattened strip is then coiled at a station 55 to form a tube 56 of the desired diameter. The tube is rotated as it is being coiled and at the point where the edges of the strip are brought together, an internal welding device 57 unites the edges in abutted relation and forms the weld seam 16a on the inside of the tube filling the internal groove provided by the chamfered or tapered walls 25a with welding metal terminating flush or slightly crowned with the inner surface of the tube. A second welding device 58 then forms the external weld seam 16b in the groove provided by the chamfered edges on the outer surface of the tube. A cutting device 59 which may be in the form of a plasma jet to instantaneously sever the tube 56 into desired lengths such as 60 receives the tube 56 therethrough providing the circumferential end cuts. The device 59 may be tilted at a desired angle relative to the longitudinal axis of the tube 56 to form the inclined oval cuts for the drop center or sump center tanks.

Inside and outside grinders 61 and 62 are provided to grind down any objectionable crowns on the weld seams 16a and 16b.

Inside and outside fluoroscope X ray detectors 63 and 64 are provided to show any defects in the weld seams 16a and 16b. Films 65 from these detectors are easily read permitting any desired additional welding to correct defects.

When the ribbon 15 is completely unwound from the coil at station 51, a new coil is rapidly mounted on the station and has its leading end welded to the trailing end of the preceding strip thereby insuring a continuous strip supply to the mill. The wound coil at station 51 provides an ample length of strip or ribbon 15 to the machine for forming a number of tube sections 59 and these sections will have a uniform steel analysis since they came from the same strip. Variation in mill runs forming the tank components, such as is likely to occur in the conventional formation of tanks from hoop sections welded in end-to-end relation, is avoided.

The mill M is compact and operates continuously to deliver the tank tubes with minimum labor requirement. All of the strip material is used. Heretofore required floor space and labor for the separate stations to form the hoop type tanks is minimized.

It will thus be understood by those skilled in this art that this invention now provides a strong, less expensive, and more uniform tank car than heretofore known. The tank cars of this invention have a spirally welded tank formed from a coiled strip or ribbon of metal with its edges abutted together and united by a continuous weld seam which maintains the integrity of the surfaces of the tank. The strips or ribbons forming the tanks are supplied in the desired width and heretofore required trimming is avoided so that the technique does not create any scrap. The coiled tubes for the tanks are continuously formed and can be continuously inspected as they are formed. Fluoroscope weld examinations, weld grinding, seam preparation, and the like can all be continuously performed as the tube is being formed.

While various changes and modifications might be proposed by those skilled in the art, it will be understood that we wish to include within the claims of the patent warranted hereon all such changes and modifications as reasonably come within our contribution to the art.

We claim as our invention:

1. The method of making tank cars which comprises spirally coiling a pressure vessel steel plate strip, abutting the side edges of the strip to form a tube, rotating the tube, welding the abutting edges together as the tube is rotated to form a sealed tube with a continuous weld seam extending the full length of the tube, grinding the weld seam flush with the inside and outside sufaces of the tube, cutting the sealed and ground tube at an angle to the axis thereof into a plurality of the tube sections, placing the sections in adjacent end-to-end relation, rotating a section 180° to provide oppositely inclined adjacent ends, extending the continuous weld seam around said oppositely inclined ends in abutted relation to provide a sealed tube with inclined sections, welding end caps on the ends of the sealed tube, and mounting the sealed tube on wheeled trucks.

2. The method of claim 1 including the cutting of the tube into two sections providing a drop center tank.

3. The method of claim 1 including the cutting of the tube into three sections providing a center sump tank.

* * * * *